(12) United States Patent
Roberge

(10) Patent No.: US 7,275,428 B2
(45) Date of Patent: Oct. 2, 2007

(54) DEVICE FOR ENSURING SAFE MOVEMENT OF A MOVING PART

(75) Inventor: Philippe Roberge, Issy-les-Moulineaux (FR)

(73) Assignee: Thales, Neuily-sur Seine (FR)

( * ) Notice: Subject to any disclaimer, the term of this patent is extended or adjusted under 35 U.S.C. 154(b) by 33 days.

(21) Appl. No.: 10/489,429

(22) PCT Filed: Sep. 27, 2002

(86) PCT No.: PCT/FR02/03312

§ 371 (c)(1),
(2), (4) Date: Mar. 12, 2004

(87) PCT Pub. No.: WO03/042706

PCT Pub. Date: May 22, 2003

(65) Prior Publication Data

US 2004/0231428 A1  Nov. 25, 2004

(30) Foreign Application Priority Data

Oct. 5, 2001 (FR) .................................. 01 12868

(51) Int. Cl.
*G01P 13/00* (2006.01)

(52) U.S. Cl. .................... 73/170.02; 73/180; 73/170.01
(58) Field of Classification Search ............... 73/180, 73/170.02, 170.01, 865.3
See application file for complete search history.

(56) References Cited

U.S. PATENT DOCUMENTS

| | | | |
|---|---|---|---|
| 3,882,721 A | 5/1975 | Doremus et al. | |
| 4,278,219 A | 7/1981 | Finance | |
| 5,438,865 A * | 8/1995 | Greene | 73/180 |
| 5,485,758 A * | 1/1996 | Brown et al. | 73/865.8 |
| 6,023,984 A * | 2/2000 | Mazur et al. | 73/865.3 |
| 6,620,455 B2 * | 9/2003 | Mensing et al. | 427/208.6 |
| 2004/0159163 A1 * | 8/2004 | Onodera | 73/856 |

* cited by examiner

*Primary Examiner*—Andre J. Allen
(74) *Attorney, Agent, or Firm*—Lowe Hauptman Ham & Berner, LLP

(57) ABSTRACT

The invention relates to a device for ensuring safe movement of a moving part. The movement of the moving part is guided along or about an axis (4; 42) and is limited by at least one stop (1; 20; 51). The device comprises means for recording the exceeding of a nominal force by a force exerted on the stop (1; 20; 51) by the moving part along or about the axis (4; 42). The invention is particularly applicable to angle-of-attack sensors used in aeronautics.

14 Claims, 3 Drawing Sheets

DEVICE FOR ENSURING SAFE MOVEMENT OF A MOVING PART

BACKGROUND OF THE INVENTION

The invention relates to a device for ensuring safe movement of a moving part.

The invention is particularly applicable to angle-of-attack sensors used in aeronautics. Such sensors are mounted on the skins of aircraft to measure the angle of attack of an airflow with respect to the aircraft. These sensors contribute to the safety of the aircraft's flight. In particular, they make it possible to prevent stalling. They are generally located in the front part of the aircraft, frequently in a horizontal position (a position called "3 o'clock" or "9 o'clock"). Such a sensor can comprise a moving vane rotatable about an axis perpendicular to the skin of the aircraft. The moving vane is orientated in the axis of the surrounding airflow. The orientation of the moving vane enables the angle of attack of the aircraft to be determined. The vane forms an appendage located on the exterior of the aircraft skin. As with all appendages, there is a considerable risk of damaging it during ground maintenance operations on the aircraft.

An impact on the moving vane may be received in any direction, and this direction would have to be exactly in alignment with the plane of symmetry of the vane for the vane not to rotate. Moreover, such an impact tends to deform the vane in a direction in which its inertia is greatest. This impact is therefore very unlikely to damage the general shape of the vane and will only deform its leading edge. Such deformation is always visible. Consequently, only those impacts which are capable of causing the vane to rotate will be considered below. These impacts are responsible for the significant damage which may be caused to the vane. Furthermore, these impacts can distort the vane, resulting in incorrect measurement of the angle of attack. Moreover, this type of deformation is not easily seen.

A moving vane cannot rotate fully through 360° about its axis of rotation. The rotation is limited by stops, allowing, for example, a range of the order of 90°.

SUMMARY OF THE INVENTION

The object of the invention is to detect impacts which may deform the vane. This type of impact causes an abnormal force to be exerted by the vane on one of its stops. If detection occurs, the vane must be recalibrated, in a wind tunnel for example.

Clearly, the invention is not limited to the angle-of-attack sensors used in aeronautics, nor to the detection of an abnormal force on a moving part rotating about an axis. The normal movement of the moving part can be, for example, a translatory movement limited by at least one stop.

The object of the invention is therefore a device for ensuring the safe movement of a moving part, the movement being guided along or about an axis and being limited by at least one stop, characterized in that it comprises means of recording the exceeding of a nominal force by the force exerted on the stop by the moving part along or about the axis.

The nominal force is defined as a limit force exerted on the moving part. If the force exerted on the stop exceeds the nominal or limit force, the moving part may suffer irreversible damage, such as permanent deformation. The fact that the nominal force has been exceeded is an indicator of damage suffered by the moving part. Consequently, the nominal force is not zero.

Advantageously, the energy used for the operation of the recording means is drawn only from the energy supplied by the force exerted on the stop by the moving part.

Advantageously, the recording means comprise means for modifying the position of the stop. In other words, the stop is retracted when the force exerted on the stop by the moving part exceeds a nominal force. More precisely, the stop is in a first position as long as the nominal force is not reached and the stop is moved to a second position when the nominal force is exceeded. The stop remains in the second position even when the force exerted on the stop by the moving part becomes less than the nominal force after having exceeded it.

BRIEF DESCRIPTION OF THE DRAWINGS

The invention will be more clearly understood, and other advantages will become evident, when the detailed description of a number of embodiments is read, this description being illustrated in the attached drawing, in which.

For greater convenience, the same elements are given the same identifying references in the different figures.

DETAILED DESCRIPTION OF THE PREFERRED EMBODIMENT

Figure 1:
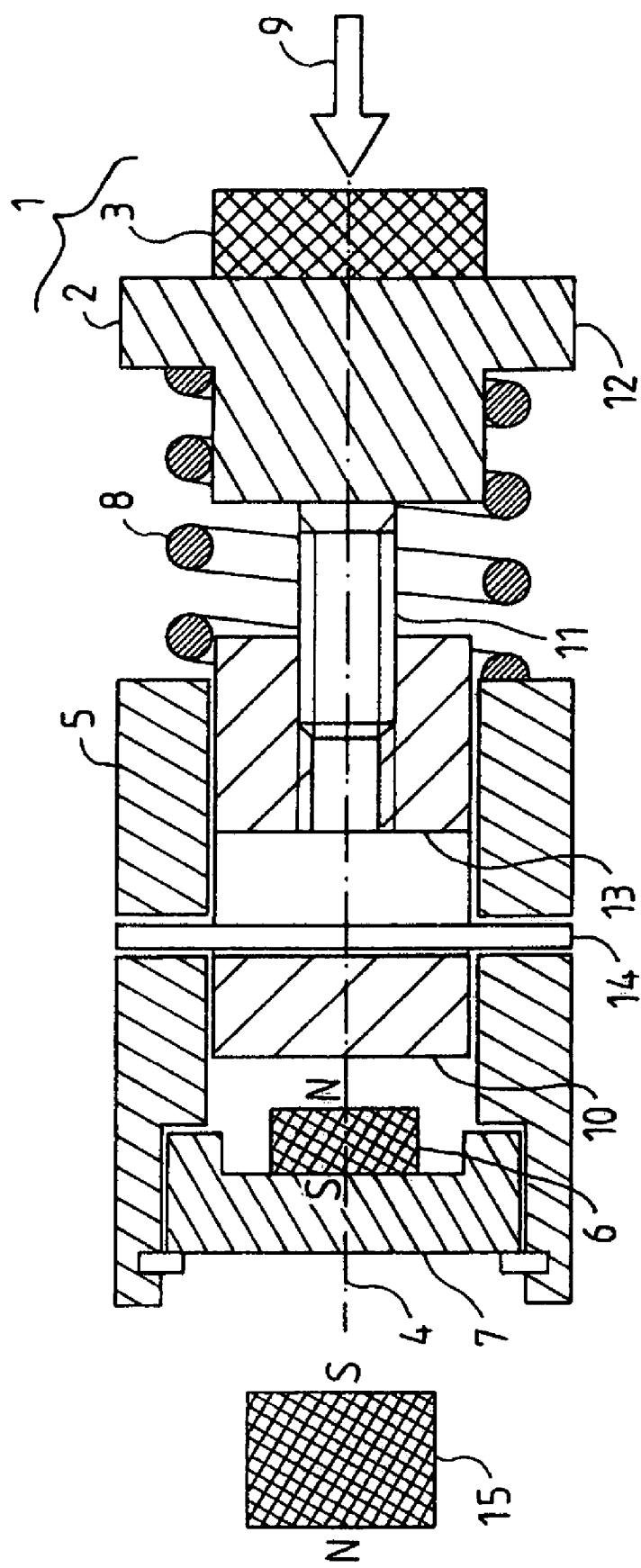
FIG. 1 shows a first embodiment of a retractable stop, for which a magnetic element enables the exceeding of the nominal force to be recorded.

The device shown in FIG. 1 comprises a stop 1 on which a moving part (not shown) is designed to bear. The stop 1 comprises a rigid part 2 and an elastic part 3, fixed to the rigid part 2 and made from an elastomer for example, on which the contact with the moving part takes place. The stop 1 can be moved by translation along an axis 4. The moving part can also move by translation along the axis 4. This movement can also take place about an axis of rotation perpendicular to the plane of FIG. 1. In this case, the moving part comprises an element whose movement essentially has the axis 4 as its tangent at the point of contact of this element with the stop 1 on the elastic part 3. The translatory movement of the stop along the axis 4 takes place with respect to a stop casing 5 in the form of an axial hollow tube 4, for example a cylindrical tube, with which the stop 1 can move.

A permanent magnet 6 is fixed to the stop casing 5. The permanent magnet 6 is, for example, connected to the stop casing 5 by means of a magnet support 7. The rigid part 2 is made from a magnetic material such that it can be attracted by the permanent magnet 6 when the rigid part 2 is in the vicinity of the permanent magnet 6. Advantageously, the magnetic flux can pass through the magnet support 7 and the stop casing 5. For this purpose, the rigid part 2, the magnet support 7, and the stop casing 5 can be made from mild steel.

An elastic element 8, such as a helical spring, keeps the rigid part 2 at a given distance from the permanent magnet 6. The elastic element 8 acts between the rigid part 2 and the stop casing 5. When the stop 1 is moved by translation along the axis 4 under the effect of a force exerted by the moving part, in the direction of the arrow 9, the rigid part 2 of the stop 1 approaches the permanent magnet 6. If the force exerted on the stop 1 by the moving part is sufficient, in other words if the force exerted exceeds a nominal force, the rigid part 2 comes into contact with the permanent magnet 6, and the magnetic force exerted by the latter is such that the rigid part 2 is kept in contact with the permanent magnet 6, even when the force exerted on the stop 1 by the moving part has disappeared.

The fact that the rigid part 2 is in contact with the permanent magnet 6 shows that the force exerted by the moving part on the stop 1 has been greater than a given force, called the nominal force.

Advantageously, the device comprises means for adjusting the nominal force. The nominal force can be adjusted by selecting the dimensions and stiffness of the elastic element 8. Additionally, the rigid part 2 can comprise means for adjusting its length along the axis 4, in order to enable the nominal force to be adjusted, even after the selection of a given elastic element 8. These adjusting means advantageously comprise a piston 10 slidable within the stop casing 5, a screw and nut system 11, and a shouldered shaft 12. The elastic part 3 is fixed to the shouldered shaft 12. The elastic element 8 acts between the shouldered shaft 12 and the stop casing 5. The screw and nut system 11 enables the piston 10 to be moved with respect to the shouldered shaft 12. By operating the screw and nut system 11, the distance between the piston 10 and the permanent magnet 6 is adjusted, thus enabling the nominal force to be adjusted.

Advantageously, the stop 1 comprises means for limiting its translatory movement along the axis 4 with respect to the stop casing 5. These means comprise, for example, an oblong hole 13 formed in the rigid part 2 or, more precisely, in the piston 10, together with a pin 14. The oblong hole 13 is radial with respect to the axis 4. The pin 14 is fixed in the stop casing 5 and passes through the oblong hole 13. The movement of the stop 1 is limited by the dimensions of the oblong hole 13 inside which the pin 14 makes a relative movement with respect to the piston 10. The means for limiting the translatory movement along the axis 4 of the stop enable the elastic element 8 to be kept lightly compressed, even when no force is exerted by the moving part on the stop 5.

When the stop 1 has come into contact with the permanent magnet 6, it is possible to provide means for resetting the stop 1, or more precisely means for returning it to the position which it had before being subjected to a force in excess of the nominal force in the direction of the arrow 9. Resetting can be carried out by pulling the stop 1 in the opposite direction to the arrow 9. This method is not very precise and may cause damage to the device, for example in the area of the pin 14. To avoid this risk, the resetting means can comprise a second permanent magnet 15 whose power is significantly greater than that of the permanent magnet 6. To reset the stop 1, the second permanent magnet 15 is brought towards the magnet support 7 along the axis 4. The second permanent magnet 15 is orientated in such a way that its pole nearer to the magnet support 7 has the same polarity as the pole of the first magnet 6 in contact with the magnet support 7.

When the second permanent magnet 15 approaches the first permanent magnet 6, the combined attractive force of the two permanent magnets 6 and 15 on the piston 10 decreases and becomes less than the force exerted by the spring 8. The piston 10 then tends to return to the original position which it had before the force was exerted by the moving part.

Clearly, one or other of the permanent magnets 6 and 15 can be replaced by an electromagnet.

Figure 2:
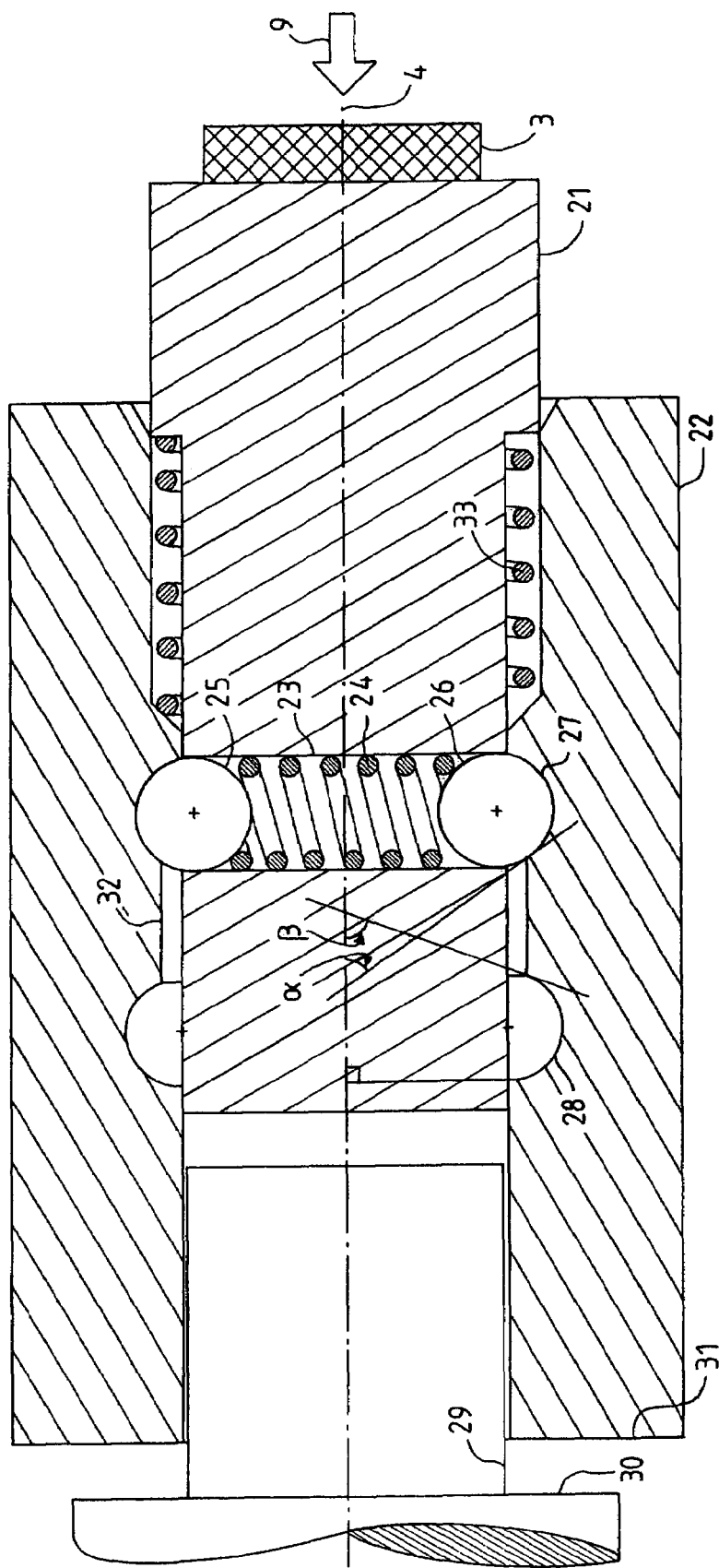
FIG. 2 shows a second embodiment of a retractable stop, for which a ball, connected to the stop, is moved from one housing to another when a force exerted on the stop exceeds the nominal force.

FIG. 2 shows a second embodiment of a retractable stop 20. The stop 20 comprises a piston 21, fixed to the elastic part 3 and movable by translation along the axis 4 under the effect of a force exerted in the direction of the arrow 9 by the moving part. The piston 21 moves by translation into a stop casing 22. The piston 21 comprises a radial cylindrical hole 23 passing through it from one side to the other. An elastic element 24, such as a helical spring, is placed inside the hole 23. Two balls 25 and 26 bear on the elastic element 24, one at each end. The two balls 25 and 26 can slide into the hole 23 when a radial force, with respect to the axis 4, is exerted on each of them. As long as the force exerted by the moving part on the stop 20 does not reach the nominal force, the piston 21 is in a first position with respect to the stop casing 22. This position is shown in FIG. 2. In this first position, the balls 25 and 26 are partially housed in a groove 27 formed in the stop casing 22. The groove 27 is, for example, toroidal about the axis 4. The small diameter of the toroid is approximately equal to that of the balls 25 and 26.

When the force exerted by the moving part on the stop exceeds the nominal force, the elastic element 24 is retracted by a centripetal thrust of the balls 25 and 26. This centripetal thrust is due to the fact that the balls 25 and 26 depart from the groove 27. The piston 21 then moves into the stop casing 22 until the balls 25 and 26 reach a second position in which they lodge in a second groove 28 formed in the stop casing 22. Like the groove 27, the groove 28 is, for example, toroidal about the axis 4.

In the embodiment described with reference to FIG. 2, it is also possible to provide means for resetting the stop 20, or more precisely for returning it from the position in which the balls 25 and 26 are in the groove 28 to the position in which balls 25 and 26 are in the groove 27. Resetting can be carried out by pulling the stop 20 in the opposite direction to the arrow 9. This method is not very precise and may cause the stop 20 to be pulled beyond its first position. It is therefore preferably to push the stop 20, again in the opposite direction to the arrow 9. This pushing action can be advantageously carried out with a cylinder 29 having a shoulder 30. The cylinder 29 penetrates into the stop casing 22 and pushes the piston 21 to reset the stop 20. The shoulder 30 comes to bear on a surface 31 of the stop casing 20 and thus limits the movement of the stop 20 when it is pushed by the cylinder 29.

The device comprises means for adjusting the nominal force. This adjustment can be made when the components of the device are manufactured. For example, the nominal force can be adjusted by adjusting the depth of the groove 27. More precisely, an angle $\alpha$ is defined between the axis 4 and a tangent to the groove 27 at the point where one of the balls 25 or 26 can escape from the groove 27 when a force is exerted by the moving part on the stop 20 in the direction of the arrow 9. The value of the angle $\alpha$ determines the value of the nominal force for a given elastic element 24. As the angle $\alpha$ increases, the nominal force rises.

It is also possible to adjust the force required to reset the stop 20 by adjusting the depth of the groove 28. More precisely, the value of the angle $\beta$ between the axis 4 and the tangent to the groove 28 at the point where one of the balls 25 or 26 can escape from the groove 28 for the resetting of the stop 20 determines the force required to reset the stop.

The values of the angles α and β can be adjusted by increasing the internal diameter 32 of the stop casing 22 between the grooves 27 and 28.

Advantageously, the device comprises means for preventing the stop 20 from passing beyond the second position. For this purpose, the angle between the axis 4 and the tangent to the groove 28 at the farthest point from the elastic part 3 is a right angle. Thus, when the balls 25 and 26 bear on this point under the action of the moving part, the stop 20 cannot pass beyond this position.

It is also possible to modify the nominal and resetting forces by interposing a supplementary elastic element 33 between the stop casing 22 and the piston 21. The elastic element 33 is, for example, a helical spring which is compressed in the direction of the axis 4 when the moving part bears on the stop 20.

The device described with reference to FIG. 2 comprises two balls 25 and 26. It would also be possible to specify a device comprising only one ball. In this case, the hole 23 into which the ball could slide would be a blind hole.

As a variant, the function of the grooves 27 and 28, in other words that of delimiting the positions of the balls 25 and 26 in the stop casing 22, can be provided by cylindrical holes radial with respect to the axis 4 and formed in the stop casing 22. The diameter of these holes can be used to adjust the nominal and resetting forces for the stop 20. These holes can be tapped, and a screw inserted into each hole from the exterior of the stop casing 22 can be used to adjust the nominal and resetting forces for the stop 20. Such a screw, fitted in a hole replacing the groove 27, can also be used to facilitate the extraction of the stop 20 from the stop casing 22 by reducing the force required for this extraction. The stop 20 is extracted by pushing it in the opposite direction to the arrow 9 beyond the first position.

Figure 3:
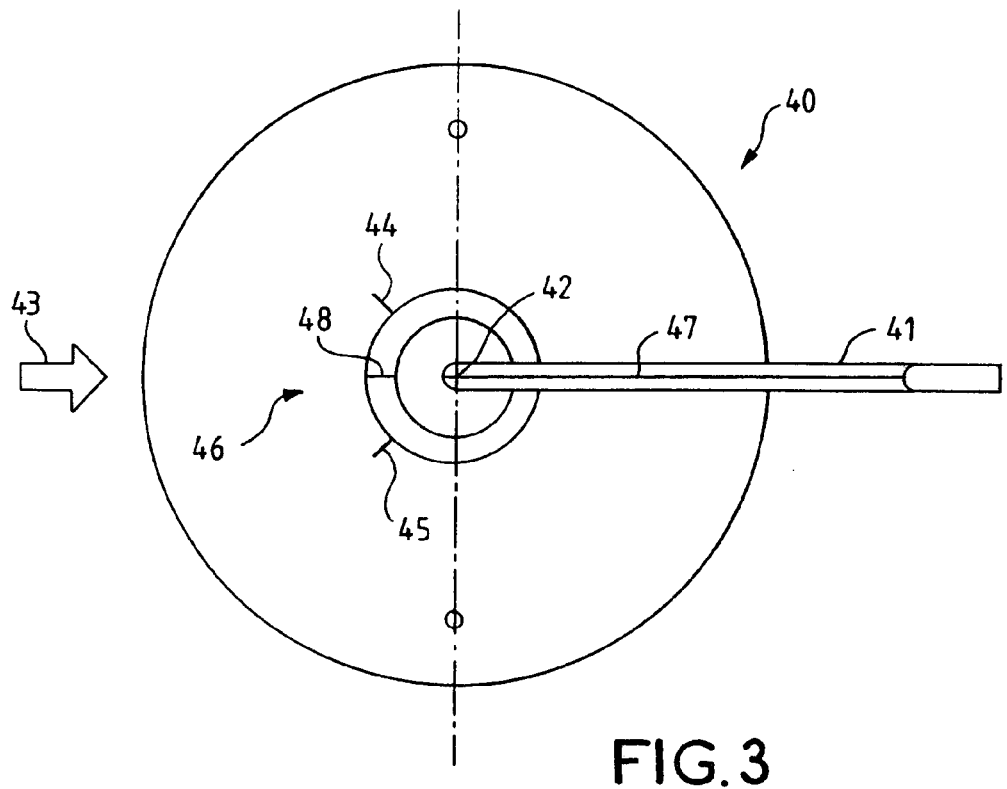
FIG. 3 shows an angle-of-attack sensor comprising a rotatable moving vane, seen in a plane perpendicular to the axis of rotation of the vane.

FIG. 3 shows an angle-of-attack sensor 40 viewed from above. The angle-of-attack sensor 40 comprises a movable vane 41 rotatable about an axis 42 perpendicular to the plane of FIG. 3. The moving vane 41 is designed to be orientated in the axis of an airflow surrounding it, the usual direction of this airflow being indicated by the arrow 43. The swing of the moving vane 41 is limited angularly, for example to + or −45° about the position of the vane in its usual orientation shown in FIG. 3. Stops, such as those described with reference to FIGS. 1 and 2, prevent the moving vane 41 from passing beyond the angular limits. In this case, the moving part is fixed to the moving vane and the stop casing 5 or 22 is fixed to a fixed part 46 of the angle-of-attack sensor 40.

Reference points 44 and 45, supported on the fixed part 46 of the angle-of-attack sensor 40, provide a visual indication of the maximum swing of the moving vane 41. More precisely, when the moving part bears, without exceeding the nominal force, on one of the stops 1 or 20, the plane of symmetry 47 of the moving vane 41 is aligned with one of the reference points 44 or 45. Advantageously, a reference point 48, supported by the moving vane 41 and aligned with the plane of symmetry 47, is located in the vicinity of the reference points 44 and 45. The reference point 48 facilitates the visual indication of the position of the moving vane 41 with respect to the fixed part 46. However, if the moving part bears on one of the stops 1 or 20 in an abnormal way, in other words with a force exceeding the nominal force, this stop 1 or 20 is retracted and the moving vane 41 can exceed its maximum swing, and the reference point 48 is then located beyond the reference point 44 and 45. Thus it is easy to diagnose the exceeding of the nominal force when the plane of symmetry 47 has passed beyond one of the reference points 44 or 45. This diagnosis can be made by manually pivoting the moving vane 41 until it comes into contact with its stops 1 or 20, while the aircraft carrying the angle-of-attack sensor 40 is on the ground. It is then possible to view the position of the moving vane 41 by observing the relative positions of the reference points 44, 45 and 48. However, the fitting of an angle-of-attack sensor 40 to certain aircraft can mask the reference points 44, 45 and 48. The position of the moving vane 41 can still be viewed by observing an angle-of-attack indicator of the aircraft, which is generally located on the instrument panel of the aircraft.

Figure 4:
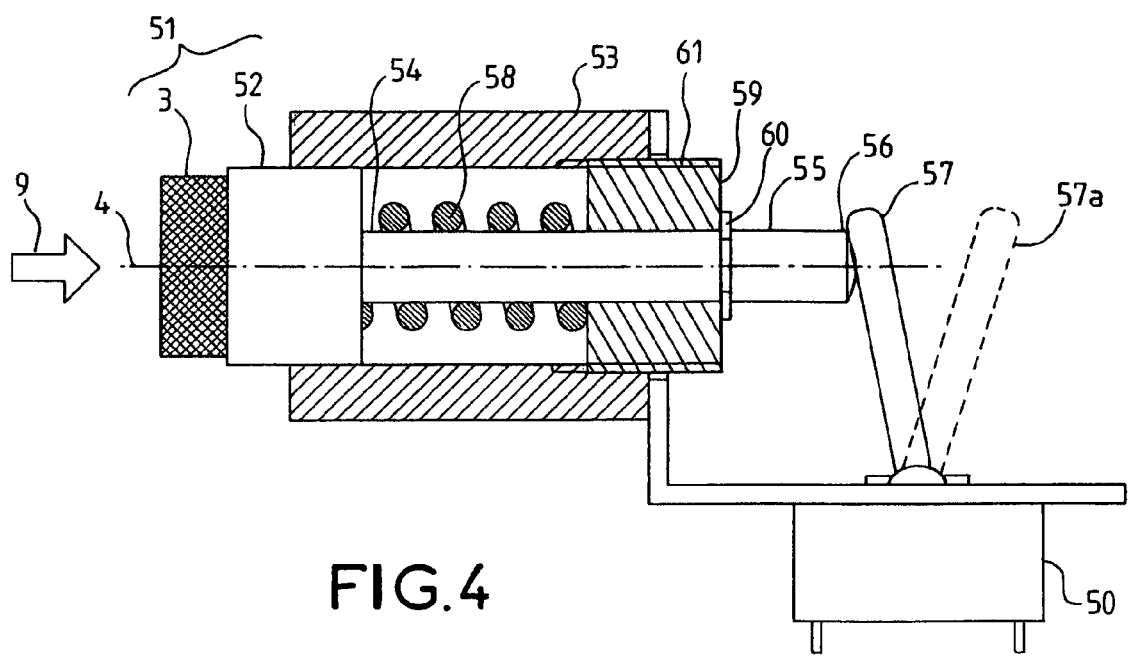
FIG. 4 shows a stop which operates a switch when the force applied to the stop exceeds the nominal force.

The embodiments shown in FIGS. 1 and 2 do not enable the exceeding of the nominal force to be diagnosed during the flight of an aircraft carrying the angle-of-attack sensor 40. This is because it is very unlikely that the moving vane 41 will reach one of its stops 1 or 20 during flight. This problem can be mitigated by providing a device of which one embodiment is described with reference to FIG. 4. The recording means comprise a switch 50 with two stable positions. The switch 50 is in a first position, as shown in FIG. 4, as long as a force exerted on a stop 51 does not exceed the nominal force. However, the switch 50 moves to a second position as soon as the force exerted on the stop 51 has exceeded the nominal force.

The stop 51 comprises a piston 52, fixed to the elastic part 3 and movable by translation along the axis 4 under the effect of a force exerted in the direction of the arrow 9 by the moving part. The piston 52 moves by translation into a stop casing 53. A first end 54 of a rod 55 is fixed to the piston 52. The rod 55 extends along the axis 4. A second end 56 of the rod 55 can operate a lever 57 of the switch 50. The lever 57 serves to change the state (open or closed) of electrical contacts belonging to the switch 50. The switch 50 is fixed to the stop casing 53. An elastic element 58 opposes the force exerted by the moving part on the stop 51. The elastic element 58, for example a helical spring, bears, at one end, on the piston 52 in the vicinity of the first end 54 of the rod 55 and, at the other end, on a cap 59 fixed to the stop casing 53.

The rod 55 passes through the cap 59 and its translatory movement in the opposite direction to the arrow 9 can be prevented, for example by means of a split ring 60, fixed to the rod 55 and bearing on the cap 59 when no force is exerted on the stop 51.

As long as the force exerted by the moving part on the stop 51 in the direction of the arrow 9 does not reach the level of the nominal force, the lever 57 does not change the state of the contacts of the switch 50, and returns to the position shown in solid lines in FIG. 4 when the force exerted by the moving part has disappeared. However, when the force exerted by the moving part on the stop 51, in the direction of the arrow 9, exceeds the nominal force, the lever 57 changes the state of the contacts of the switch 50 and moves to the position 57a of the lever 57, a position shown in broken lines in FIG. 4.

The change of state of the contacts of the switch 50 can inform a processing unit, external to the device and not shown, that the nominal force has been exceeded. Advantageously, if the device is used in an angle-of-attack sensor 40, as shown in FIG. 3, when the lever 57 moves to the position 57a the switch 50 can break a heating circuit belonging to the angle-of-attack sensor 40. In other words, the switch 50 is connected in series in the heating circuit, and opens the heating circuit when it is in its second position 57a. Thus the switch 50 makes it possible not to increase the number of electrical channels leaving the angle-of-attack sensor 40. Moreover, the heating circuit is generally monitored by a control unit of the aircraft. If the heating circuit is broken, the angle-of-attack sensor 40 is declared out of service by the control unit. Thus no supplementary element has to be added to the monitoring means already present in the aircraft. However, the switch 50 connected in series in the heating circuit degrades the reliability of this circuit.

The device shown in FIG. 4 also comprises means for adjusting the nominal force. To make this adjustment, it is possible, for example, to move the cap 59 along the axis 4 with respect to the stop casing 53. This movement can be made by means of a screw thread 61 between the cap 59 and the stop casing 53.

The invention claimed is:

1. A device for ensuring safe movement of a moving part, comprising:
   an axis of movement for guiding a moving part along or about an axis and being limited by at least one stop, and
   recording means for recording the exceeding of a nominal force by the force exerted on the stop by the moving part along or about the axis.

2. The device as claimed in claim 1, wherein the axis is an axis of rotation.

3. The device as claimed in claim 1, wherein the energy used for the operation of the recording means is drawn only from the energy supplied by the force exerted by the moving part on the stop.

4. The device as claimed in claim 1, wherein the recording means comprises means for changing the position of the stop.

5. The device as claimed in claim 4, wherein the stop is in a first position as long as the nominal force is not reached and in that the stop moves to a second position when the nominal force is exceeded.

6. The device as claimed in claim 5, wherein the stop remains in the second position.

7. The device as claimed in claim 6, wherein the device comprises means for returning the stop to the first position.

8. The device as claimed in claim 5, wherein the device comprises means for preventing the stop from moving beyond the second position.

9. The device as claimed in claim 1, wherein the device comprises means for adjusting the nominal force.

10. The device as claimed in claim 1, wherein the recording means comprise a switch with two stable positions, in that the switch is in a first position as long as the nominal force is not reached and in that the switch moves into a second position as soon as the nominal force has been exceeded.

11. The device as claimed in claim 10, wherein the moving part is a moving vane designed to be orientated in the axis of an airflow surrounding the moving part, wherein the moving vane comprises a heating circuit, wherein the switch is connected in series in the heating circuit, and wherein the switch opens the heating circuit when it is in its second position.

12. The device as claimed in claim 1, the stop comprising:
    a rigid part; and
    an elastic part operatively connected with the rigid part.

13. The device as claimed in claim 12, wherein the device is configured such that the elastic part receives at least a portion of the force exerted on the stop.

14. A device for ensuring safe movement of a moving part, comprising:
    an axial guide arranged to guide a moving part along or about an axis and limited by a stop; and
    a recording device arranged to record the exceeding of a nominal force by a force exerted on the stop by the moving part along or about the axis.

* * * * *